United States Patent [19]

Mancosu et al.

[11] Patent Number: 4,989,690

[45] Date of Patent: Feb. 5, 1991

[54] EMERGENCY DEVICE TO ALLOW A NUMBER OF PEOPLE TO BE TRANSFERRED BETWEEN TWO AREAS APART FROM EACH OTHER

[75] Inventors: Federico Mancosu, Milan; Giovanni Daminelli, Bergamo, both of Italy

[73] Assignee: Industrie Pirelli S.p.A., Milan, Italy

[21] Appl. No.: 478,461

[22] Filed: Feb. 12, 1990

[30] Foreign Application Priority Data

Feb. 16, 1989 [IT] Italy ................ 19462 A/89

[51] Int. Cl.$^5$ .............................................. A62B 1/20
[52] U.S. Cl. ..................................... 182/48; 193/25 R
[58] Field of Search .......................... 182/48, 49, 41; 193/25 R, 25 A, 25 C

[56] References Cited

U.S. PATENT DOCUMENTS

| | | | |
|---|---|---|---|
| 355,994 | 1/1887 | Horwitz | 193/25 R |
| 2,253,604 | 8/1941 | Blain | 182/41 |
| 3,339,690 | 9/1967 | Craig | 182/48 |
| 3,371,801 | 3/1968 | Widegren | 182/41 |
| 3,470,991 | 10/1969 | Holcombe . | |
| 3,838,750 | 10/1974 | Williams, Jr. et al. . | |
| 4,589,519 | 5/1986 | Hunter | 182/48 |

FOREIGN PATENT DOCUMENTS

| | | | |
|---|---|---|---|
| 34371 | 8/1981 | European Pat. Off. . | |
| 2710054 | 9/1977 | Fed. Rep. of Germany | 182/41 |

Primary Examiner—Reinaldo P. Machado
Attorney, Agent, or Firm—Stevens, Davis, Miller & Mosher

[57] ABSTRACT

An emergency device is provided to enable a number of people to be transferred between two areas far apart from each other. The device includes a flat relatively stiff plate capable of being rolled up upon itself and susceptible of longitudinal and transverse deformations according to curvilinear profiles, and plate-deforming elements to change the plate from a flat configuration to an operational one including successive transversely oriented hollow portions. The deformation elements can be a waterproof fabric layer joined to the plate sides and provided with tubular ducts extending over the entire length of the plate. Under operating conditions, the plate is unrolled and the tubular ducts are inflated with pressurized fluid to deform the plate according to the successive hollow portions. The upper layer of the fabric can form an emergency slipway for a plurality of people and the lower hollow-shaped plate can provide a slipway for moving articles.

19 Claims, 3 Drawing Sheets

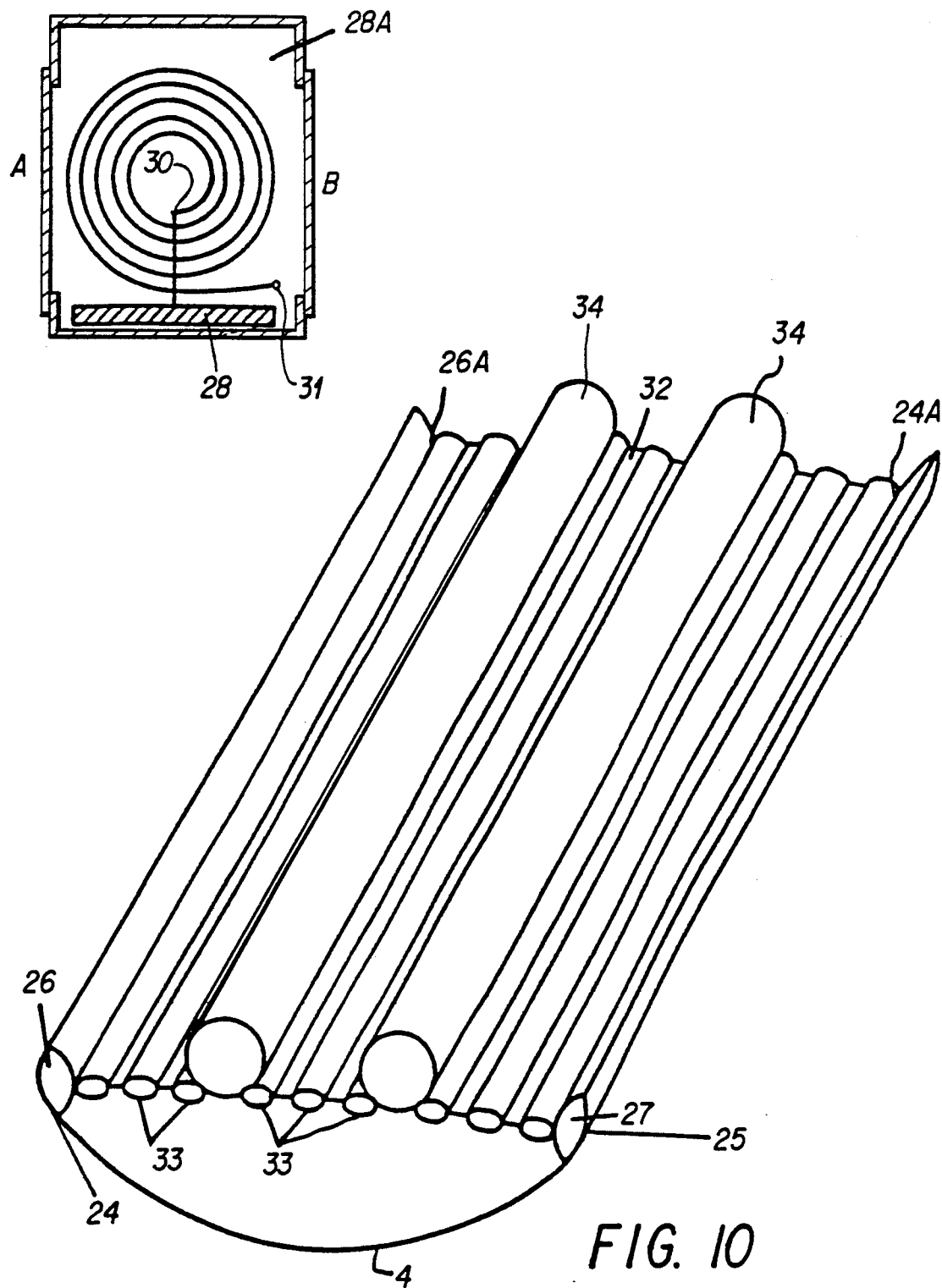

EMERGENCY DEVICE TO ALLOW A NUMBER OF PEOPLE TO BE TRANSFERRED BETWEEN TWO AREAS APART FROM EACH OTHER

FIELD OF THE INVENTION

The present invention relates to an emergency device for enabling a number of people to be transferred between two areas far apart from each other, and more particularly, to a device which within a short period of time can be made ready to allow people and/or things to be moved away from one area to another during emergency conditions; among other things, the invention relates to an emergency slipway, for example, for ships, planes, buildings and/or industrial plants and also for creating a temporary bridge.

BACKGROUND OF THE INVENTION

Emergency devices such as slipways and the like are already known and are used to evacuate people between two areas far apart from each other, such as a slipway between a position on board a ship and a raft or a lifeboat. Generally, such devices consist of a great number of inflatable tubular elements made of rubber or other similar material, extended lengthwise between the ship and the sea surface up to a raft or a lifeboat. Fabric layers are provided between the different tubular elements disposed in side-by-side relationship. The fabric layers form slipping surfaces capable of being used simultaneously by several people in order to escape from dangerous areas. It is clear that the slipway must be sufficiently strong to ensure a continuous salvaging function over the entire emergency period, while being subjected to very significant mechanical stresses. Consequently, the stiffening structures in known slipways consist of several groups of inflatable tubular elements disposed one upon another.

Unfortunately the known art does not succeed in meeting satisfactorily two requirements both necessary to such devices, i.e., on the one hand, how to allow an appropriate storage of the device in predetermined areas within a restricted room and, on the other hand, how to make the device immediately usable in case of emergency.

In practice, is it is likely that by adopting a system completely made of deformable material and consisting of tubular elements alternated with slipping layers the manufacturer is capable of supplying the user with a properly folded device ready to be stored and having an acceptable bulkiness; however, the use of this system cannot take place quickly during an emergency because, due to the great number of superposed layers of tubular elements, waiting times are necessarily very long since they involve the complete inflating of the stout structure of the entire device.

In addition, the presence of a great number of tubular elements obviously requires that one or more sources should be arranged for the introduction of fluid under pressure into each tubular element as well as requiring a complex arrangement of many valves, ducts, and several safety devices.

It is furthermore apparent that (1) the presence of a source of fluid under pressure having sufficiently large power to inflate such a large structure, but which is virtually never used (except in exceptional emergency circumstances) and (2) the number of accessory parts required for the introduction of fluid into the tubular elements bring about several drawbacks related to the complexity of accomplishment of the same and consequently increased costs.

It is also to be pointed out that the heretofore known devices, once used, give rise to difficulties for their return to a stowed condition after use, due to the necessary folding operations involving a great mass of deformable material which does not lend itself to be stowed in an orderly manner.

In addition, known devices solving some of the above-mentioned drawbacks are not adapted for use in all possible emergency situations in any environment, for example, they cannot be used as an escape way from very tall buildings in case of emergency or for accomplishing a temporary bridge for civilian and/or military use.

SUMMARY OF THE INVENTION

Consequently, the object of the present invention is to provide an emergency device to allow a number of people to pass and/or to escape between two areas far apart from each other while avoiding all of the above-mentioned drawbacks.

This object is substantially achieved by an emergency device adapted to constitute a passage and/or escape means for a number of people and/or means between two areas far apart from each other, characterized in that it comprises: (1) a flat stiff plate capable of being rolled up upon itself and susceptible of longitudinal and transverse deformations according to curvilinear profiles; and (2) elements for carrying out the spring deformation of the plate according to curvilinear profiles in planes lying transversely to the plate and comprising at least a portion extended between two end points according to one direction, and shortening means for shortening the length of said portion; wherein said portion of the deformation elements has its end points fastened to the plate at either side of the longitudinal center line of the plate.

BRIEF DESCRIPTION OF THE DRAWINGS

The above and other objects, advantages and features of the invention will be more fully understood when considered in conjunction with the following discussion and the attached drawings, of which:

FIG. 10 is a partial perspective view of one embodiment of the device shown in FIG. 1; and FIG. 11 shows the device in a rest position.

DETAILED DESCRIPTION OF THE PREFERRED EMBODIMENTS

Figure 1:
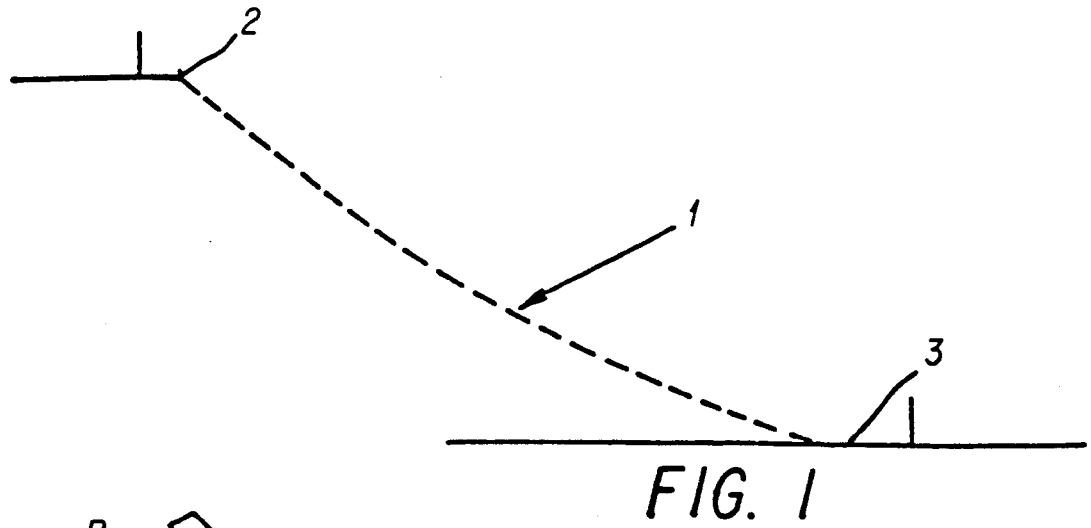
Fig. 1 shows schematically an emergency device extending between two points far apart from each other.

Shown in FIG. 1 by dotted line is a device designed to constitute an escape way or a temporary passage way for a number of people between two areas 2, 3 far apart from each other. The device can be used in case of emergency to connect, e.g., the exit door of an airplane to the landing strip, the roof of a civilian or industrial building to the road or to the terrace of another building or still further to allow a number of people to evacuate from on board a ship toward a lifeboat in the vicinity of the ship.

Figure 2:
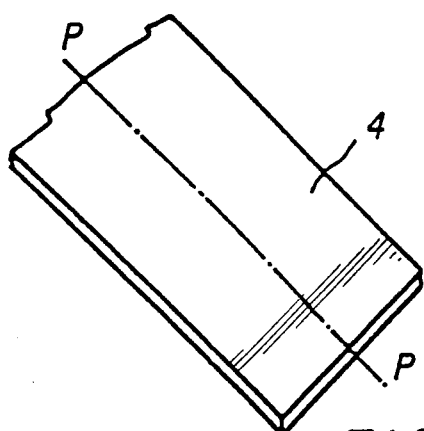
FIG. 2 shows a still plate forming the fundamental part of the device.
Figure 3:
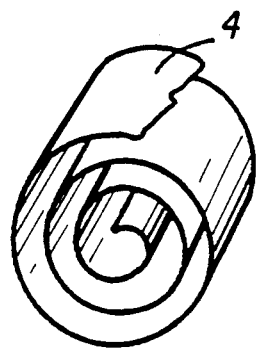
FIG. 3 shows the plate viewed in FIG. 3 rolled up upon itself.
Figure 4:
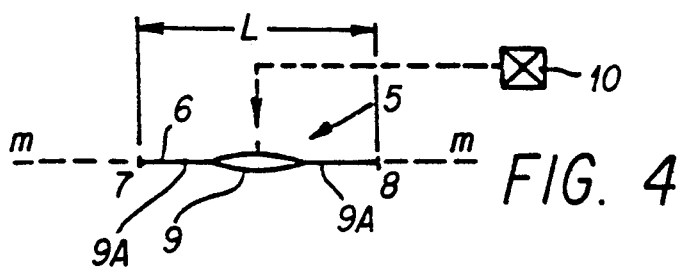
Fig. 4 shows schematically an example of a further fundamental element of the device of FIG. 1.

In a general form the device comprises substantially two parts consisting of first, a stiff flat plate 4 capable of being rolled up upon itself (FIGS. 2 and 3), susceptible of longitudinal and transverse deformation as shown in dotted line in FIG. 1 and 2 respectively, and secondly, elements 5 adapted to cause the spring deformation of plate 4 according to hollow shapes disposed in succession in a transverse direction of plate 4 (FIG. 4).

Elements 5 (see FIG. 4) comprise at least a portion 6 extended between two end points 7, 8 according to a direction m—m and shortening means acting on the length L of portion 6. In addition, ends 7, 8 of elements 5 are fastened to the surface of plate 4 at locations which are on opposite sides with respect to the center line p—p of plate 4 and aligned with the transverse direction of the plate.

Hereinafter the terminology "elements with at least one portion extended according to one direction and shortening means for that portion" indicates that said elements can be shaped as elongate bodies or take forms different from an elongate form, e.g., being arranged in layers, provided that in all adoptable solutions there is at least one size or dimension of the elements which is adapted to be associated with the plate in a transverse direction and which is susceptible of being reduced in length so as to deform the plate to form successive hollow portions of the plate.

Should elements 5 be in the form of an embodiment involving continuous layers with the same length as the distance between the two points to be connected, according to a preferred solution the upper surface of said layer-shaped extension can be used as a slipway for a number of people and the underlying part consisting of the deformed hollow-shaped plate can be a means for the transfer of different objects between the two points to be connected.

When the elements 5 are elongate bodies, according to one embodiment the hollow-shaped plate provides the only slipping surface to be used in particular for short lengths.

Figure 5:
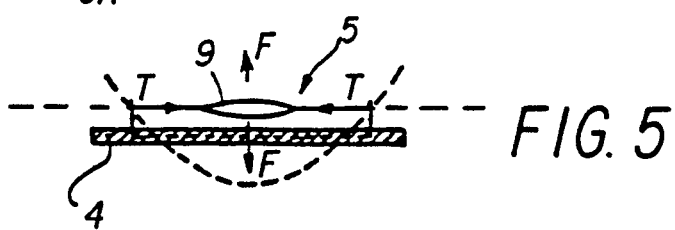
FIG. 5 shows the element viewed in FIG. 4 applied to the plate of FIG. 2.

According to another embodiment, portion 6 comprises a waterproof envelope 9 and two tie rods 9A associated with the envelope sideways and the ends of which are secured to the plate. In this embodiment, the shortening means of portion 6 acts in response to fluid under pressure sent into the envelope by a supply source 10. As is apparent from the diagram in FIG. 5, the expansion of envelope 9, represented by radial forces F, originates forces T on the tie rods directed from the end points toward the center thereby giving origin to the passage of plate 4 from the flat configuration to a curvilinear hollow-shaped configuration as shown in dotted lines in FIG. 5, useful to constitute an emergency slipway or the like. In this embodiment, or in other embodiments of the same general type, elements 5 are made of a folding material resistant to tensile strength, such as, among others, a rubberized fabric.

Figure 6:
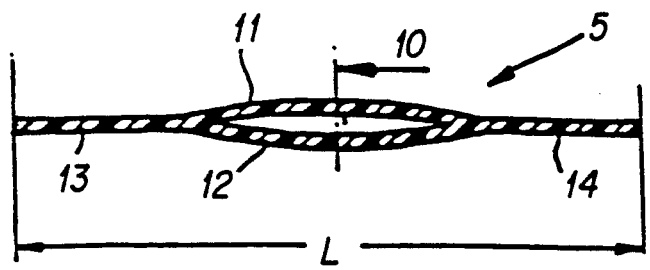
FIGS. 6 and 7 are cross-sectional and perspective views respectively of embodiments of the element shown in FIG. 4.

One possible embodiment of the invention includes forming a number of deformation elements 5 separated from each other and located in an orderly succession on the plate. Each element comprises a hermetically sealed bag including two superposed rubberized fabrics 11, 12 (FIG. 6) and associated with the edges of the plate through side tie rods 13, 14. The bag is supplied with fluid under pressure 10, in order to deform the plate into a hollow-shaped configuration.

Figure 7:
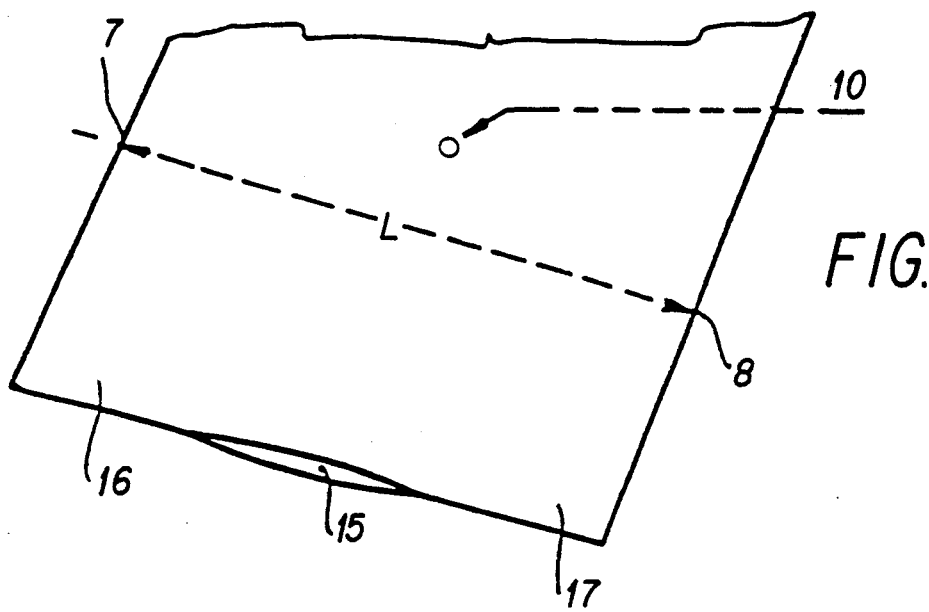

In a preferred embodiment of deformation elements 5 (FIG. 7), provision is made for at least one inflatable duct 15 made of rubberized fabric, the length of which is equal to the length of the plate, and portions 16, 17 resistant to tensile stress and disposed sideways and integrally with duct 15. The ends of side portions 16, 17, in turn, are associated with the plate, as indicated above. The two side portions 16, 17 can be extended in a continuous manner over the whole length of the tubular element or tube and can be made of a rubberized fabric which is caused to adhere to the rubberized fabric of the duct according to known procedures. This embodiment, according to the general concept of the invention, is based on the fact that the plate deforming elements have a continuous succession of portions of a given length L which are subject to shortening after the introduction of air under pressure into duct 15. According to this embodiment, the upper part of the rubberized fabric layer constitutes the slipping means for a number of persons.

Figure 8:
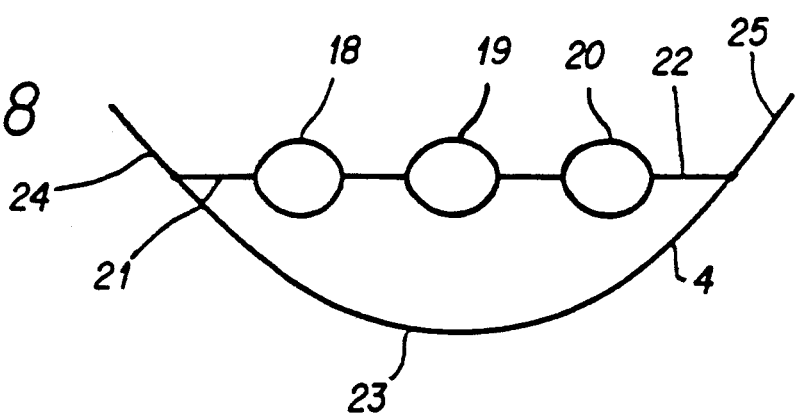
FIG. 8 is a cross-sectional view of the device in its operating condition.

A further embodiment of the invention (FIG. 8) is based on the use of a plurality of inflatable ducts 18, 19, 20 disposed in side-by-side relationship in order to form a corrugated layer having lateral end portions 21, 22 fastened to plate 4 so as to give it a hollow shape as shown in FIG. 8. In this embodiment, the outer surface of the layer constitutes the slipping way for a number of people and inner surface 23 of the hollow area can constitute an emergency slipway for transferring different articles between the two areas 2 and 3 shown in FIG. 1.

Figure 9:
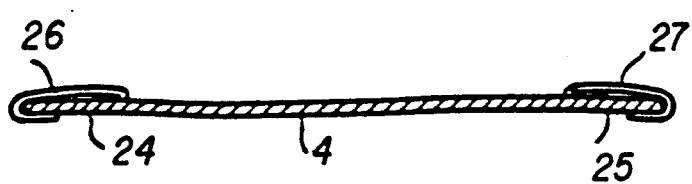
FIG. 9 shows some construction expedients in order to make the edges of the plate shown in FIG. 3 stiffer.

In a further embodiment of the invention which is particularly suitable for devices adapted to constitute an escape-way between two areas 2 and 3 (FIG. 1) which are very far apart from each other, e.g. 20 to 65 meters, provision is made for longitudinal stiffening means for edges 24, 25 of plate 4. Preferably, this stiffening means comprises at least two ducts 26, 27 (FIG. 9) made of rubberized material, which can be inflated with fluid under pressure. The two ducts 26, 27 can be in the form of layers the ends of which are associated with edges 24 and 25 of plate 4, as clearly shown in FIG. 8, in order to exhibit, after inflation, an important compressive strength applied to the edges of plate 4 in the longitudinal curvilinear configuration taken by points 2 and 3.

As can be seen, for example, in FIG. 10, the inflation of ducts 26, 27 causes the edges to bend giving rise to the above-mentioned compressive resistance.

In addition, it is possible to provide several tubular ducts associated with each edge so that, in case of accidental and/or sudden flattening of a duct, the other duct or further ducts disposed in side-by-side relationship and duly inflated may, in any event, cause the stiffening in the edge area of plate 4. It is also possible to connect to each other two ducts located at the edges by means of a tube so that the flattening of one of them brings about the automatic flattening of the one disposed at the other edge.

According to a preferred embodiment, the stiffening means can be as shown in FIG. 10, namely the stiffening means can comprise at least two inflatable tubular ducts 26, 27 associated with plate edges 24, 25 and the sides of the rubberized fabric layer can be fastened along longitudinal lines 26A, 27A of the ducts located at the edges. Should one or both ducts located at the edges be submitted to flattening, the same tension which is due to the inflating of the central ducts of the rubberized fabric layer will give rise to a bending state at the plate edges which will result in a sufficient longitudinal compressive resistance of the edges.

The plate 4 of the above-described and illustrated embodiments is a flat plate made of stiff material, which means that the plate, as compared with a square surface of 1 m sides, has a very small thickness which, in most of the involved applications, can range between 0.5 mm and 10 mm or beyond.

Still more particularly, examples of plates adapted for use in the present device are those which can comply with the following features of indeformability to shear and bending stiffness for a plate sample with a square surface of 1 m sides and a thickness in the range of 1 to 3 mm. First, indeformability to shear: the plate when submitted to parallel forces of 10 kg applied in the opposite way to opposite sides is subjected to the displacement of one side relative to the other in the direction of the side itself for a value lower than 1 mm; and second, bending stiffness: the plate when restrained at one end point and submitted to a 1 kgm bending moment at the other end point takes a curvilinear shape defined by a radius in a range of 50 to 500 cm.

The plate 4 is preferably made of thermosetting plastic materials, more particularly, a polyester resin preferably strengthened with discontinuous glass fibers, a polycarbonate or a polyamide resin or still other composite materials.

The plate 4 can be made of metal sheets made of steel or, for example, it can be accomplished by adopting elastomer sheets or the like provided that a structure is incorporated within said material which is capable of avoiding the deformation to shear such as, for example, a network structure in which the longitudinal and transverse elements forming the net are locked to each other at their intersection points.

Further embodiments of the invention include a plate 4 comprising several superposed layers all formed with the same material or even with different materials and possibly including stiffening elements such as, for example, the introduction of wires and the like according to the maximum tensioning directions. The stiffening elements in the plate can be in the form of transversely disposed staves and the plate thickness can vary from one point to another. The plate can include a number of transverse staves disposed in side-by-side relationship and one or more stiffening layers located underneath. For example, provision can be made for one rubberized square fabric in which the angles between the fabric strings and the stave direction will be 45° wide and a second rubberized fabric comprising cords disposed at 90° relative to the stave direction. The fabric can be made of polyamide resin. In some embodiments the lower fabric can be made of rayon or polyamide resin or even aramide resin or it can include metal cords.

The main object of the first square fabric is to keep the different staves in a side-by-side relationship so that both spacing apart movements and sliding movements relative to the stave direction are prevented. The second fabric is provided to exert a tensile stress in operation.

Preferably, the staves are made of plastic material, for example, polyester resins with glass fibers oriented in the stave direction and upper fibers disposed randomly. In one embodiment, the stave ends can have a bigger thickness than the remaining part so as to increase the compressive strength when the plate is curved in use or also to make the stave take a given configuration.

The junction between stiff plate 4 and deformation elements 5 is carried out depending upon the material used for the two parts; more particularly, if elements 5 are made of rubberized fabric it is possible to incorporate the respective ends of said fabric along end portions of the resin forming the plate or in other cases the two parts are bound to each other by adhesion or heat sealing or using any auxiliary means such as flat clamps.

After assembling the plate and the deformation elements, the plate is rolled up according to a cylindrical configuration in the form of a plurality of concentric coils as shown.

Alternatively, the plate can be rolled up starting from the two longitudinal end points, thereby forming two bobbins joined to each other by an intermediate portion of the plate which can have a bigger thickness than the other portions.

The device, after being readied for use as noted above, can be put in a suitable place according to a great number of possible storage methods, one of which has been diagramatically shown in FIG. 11 by way of example and is hereinafter described.

Assuming that device 1 is to be used as an emergency slipway, the corresponding winding-on coil can be located on a stiff platform 28 within an appropriate framing 28A arranged at one side of the ship and provided with two side openings A and B, one of which allows access and the other of which allows ejection of the slipway, both openings being closed by a door which may be opened in case of emergency. The platform can be moved and suitably oriented. The two coil ends 30 and 31 are respectively associated with the platform and an inflatable raft (not shown) of known type, ejected together with the slipway.

While the unwinding operation is taking place, the supply source for the introduction of air under pressure into the inflatable ducts of the device is activated either manually or automatically, thus achieving the hollow-shaped configuration of the plate and the subsequent creation of the emergency slipway.

It is noted that the ducts can be inflated with other fluids rather than air, for example, among others, carbon dioxide and nitrogen.

The supply source can be of an already known type, namely either a compressor on board of a ship with flexible hoses associated with the ducts or suitable bottles the valves of which are responsive to the unwinding action of the plate or at all events provided with control means for the delivery of air.

Disclosed hereinafter is, by way of example only, a possible embodiment of the emergency slipway illustrated in FIG. 10. The device of FIG. 10 comprises a plate 4 and a rubberized fabric layer 32 the ends of which are connected to the tubular side ducts 26, 27 useful for stiffening the plate edges. The plate-deformation elements in the form of hollows are represented by several side-by-side tubular elements 33. According to a preferred embodiment the slipway, formed with an upper corrugated surface of the rubberized fabric layer, is divided into several descent lanes each defined by inflatable tubular ducts 34 bigger than tubular elements 33 and projecting from the layer surface.

The boundary ducts can be fixed by gluing either along longitudinal and parallel portions of the fabric layer or each of them along two side-by-side ducts 33 intended for shaping the plate into hollows.

An example of the device is defined by the following data:

| Flat stiff plate: | |
| --- | --- |
| material forming the plate = | polyester resin with glass fibers |
| plate length = | 63,000 mm |
| plate width = | 4,000 mm |
| plate thickness = | 3–6 mm |
| width of the plate edges subjected to stiffening = | 500 mm |

| Deformation elements: | |
| --- | --- |
| material: a layer of rubberized material with inflatable ducts for the hollow-shaped deformation and the stiffening of the plate edges. | |
| layer length = | 63,000 mm |
| transverse size L of the layer (measured between the attachment end points 26A-27A to the tubular elements designed to make the edges stiffer) = | 3,300 mm |
| tensile strength of the layer = | 5 kg/mm |
| number of ducts: | |
| deformation ducts = | 9 |
| edge stiffening ducts = | 2 |
| lane stiffening ducts = | 2 |
| pressure of inflating air in ducts = | 0.1–0.3 kg/cm$^2$ |

When the attachment takes place between rubber and plastics a glue of known type is used for attaching the plate to the rubberized fabric.

| Maximum outer diameter of the plate rolled up upon itself = | 2000 mm |
| --- | --- |
| Size L of the layer after inflation = | 3000 mm |
| Maximum rise of the hollow between the rubberized fabric layer and the plate bottom = | 750 mm |

The invention attains all the above-noted purposes as hereinafter explained.

The device according to the invention comprises a stiff plate the follow-shaped deformation of which (in order to form a slipway) is achieved by shortening said portions of the deformation elements applied transversely to the plate. The unfolding of the plate from the cylindrical configuration in the form of superposed or concentric coils to the one corresponding to the curvilinear configuration between two areas to be connected takes place in an orderly manner and immediately, due to the fact that, as the plate is made of a stiff material adapted to form the stout structure of the device, it controls the whole formation of the slipway in a correct manner and at each instant. The unwinding times of the plate are independent of the arrangement of the deformation elements because these elements applied to the plate are compelled to follow the longitudinal unfolding of the same as a result of its being stiff, practically without any sort of inertia.

Should the deformation elements consist of rubberized fabric provided with ducts, as, for example, shown in the embodiment of FIG. 10, the unfolding of the plate will compel the tubular ducts to carry out a corresponding unfolding in the absence of any superposition of fabric parts. Consequently, the tubular ducts can be inflated immediately in order to cause the hollow-shaped deformation of the plate and, if it is provided, to define several lanes.

In other words, in contrast with known devices in which the formation of the slipway can be delayed by the presence of folds and of mutually superposed fabric parts, in the present invention the formation of the slipway takes place freely and correctly, without encountering any type of hindrances.

In addition, even if the deformation elements are accomplished by the use of tubular elements as shown in FIG. 10, it will be recognized that, due to the small number of tubular elements used, the inflation time necessary to give the plate a hollow-shaped configuration will be reduced significantly compared with that of the known device comprising a plurality of groups of tubular elements disposed in several layers.

The above-mentioned result is achieved while keeping the overall bulkiness of the device within limits to allow it to be stored in a small space. In fact, due to the particular feature of the plate which enables it to be rolled up upon itself, the overall device can be wound up so as to form a cylindrical configuration with concentric coils very close to each other and this, moreover, when the deformation elements are made of materials having a very high folding character as in the case of the fabric layer used in the embodiment shown in FIG. 10.

The storage of the device under the form of concentric coils is also a determining factor in enabling, during a subsequent use, the correct unfolding of the same from the rest position to the operating position for the creation of the slipway.

While various embodiments of the emergency device in accordance with the invention have been described, all possible variations thereof which are accessible to an expert in this particular field fall within the scope of the invention.

For example, the device can be used to interconnect two areas which are at the same level, among other things for the purpose of creating a temporary passageway across a river or an alternative road, for example, in place of collapsed viaducts or bridges as a result of floods or the like. The device made of materials having an appropriate strength can also be used to temporarily connect two areas far apart from each other in order to allow means of any kind to pass therethrough, such as for example motor vehicles. In addition, the device, with all its above-described parts, can offer an escapeway between two areas far apart from each other, with the only difference from the previous embodiment (reference being made for example to FIG. 8) residing in that the hollow-shaped part of plate 4 is turned downwardly and the slipping surface is the one corresponding to the inner surface of the corrugated fabric provided with tubular elements 18, 19 and 20. In a still further embodiment the device can include several units each being conceived for example as the one shown in FIG. 10. According to this embodiment the different units arranged as viewed in FIG. 8, can be associated in parallel or in series in order to form a single temporary passageway. According to another variation, the deformation elements can consist of elongate bodies with telescopically disposed slidable parts spaced apart from each other by fluid under pressure. In addition, the fabric layer can be coated with appropriate substances such as natural and/or synthetic rubber latex or plastic materials adapted for coatings, for example polyvinylchloride.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art.

We claim:

1. An emergency device for providing a passage for people and articles between locations spread apart from each other, said device comprising:
   (a) an elongated plate comprising means enabling it to be alternately laid flat and rolled up upon itself by longitudinal deformation thereof and to undergo transverse deformation according to curvilinear profiles; and
   (b) a plurality of deformation imparting elements for causing said transverse deformation of said plate according to said curvilinear profiles, each of said deformation imparting elements comprising at least a middle portion extending between two end points thereof and means for shortening the length of said middle portion; said two end points being fastened to said plate at opposite sides of a longitudinal center line of said plate.

2. A device according to claim 1, wherein each of said deformation imparting elements comprises folding material resistant to tensile stress.

3. A device according to claim 1 or 2, wherein each of said deformation imparting elements is made of rubberized fabric.

4. A device according to claim 1, wherein said shortening means is operable responsive to pressurized fluid.

5. A device according to claim 1, wherein said middle portion comprises a waterproof envelope fastened by two tie rods to said plate, said two tie rods comprising said two end points which are fastened to transverse sides of said plate and said shortening means is actuated responsive to a fluid introduced under pressure from a supply source into said envelope to expand said envelope and deform said plate to a hollow-shaped configuration.

6. A device according to claim 1, wherein said middle portion comprises (i) at least one inflatable tubular element having a length substantially the same as that of said plate and (ii) two side portions resistant to tensile stress located respectively at each side of said tubular element, said two side portions being of a one-piece construction with said tubular element and wherein said shortening means comprises said tubular element adapted to receive fluid under pressure to be introduced therein, said two side portions each having free ends respectively including said two end points attached to said plate.

7. A device according to claim 6, wherein said portions are continuous and extend over an entire length of said tubular element.

8. A device according to claim 6, wherein said tubular element comprises two mutually superposed layers.

9. A device according to claim 1, wherein said deformation elements are fastened at said two end points to an upper surface of said plate and wherein said shortening means deforms said plate to create an upwardly facing hollow to provide a passage and/or escape surface between said two areas spaced apart from each other.

10. A device according to claim 1, wherein said middle portion comprises a plurality of ducts made of waterproof material connected to each other so as to form a continuous corrugated layer to provide a slipping surface having a length which is the same as that of said plate and a pair of side ends located respectively at each side of said plurality of ducts and including respectively said two end points attached to said plate, each transverse section of said corrugated layer comprising a portion which extends between two end points and said shortening means shortens each of said transverse sections responsive to introduction of fluid under pressure into said tubular elements.

11. A device according to claim 10, wherein said two end points of said corrugated layer are connected to an upper surface of said plate.

12. A device according to claim 10, wherein said two end points of said corrugated layer are connected to a lower surface of said plate to deform said plate into a configuration of a downwardly facing hollow, said corrugated layer providing a slipping surface between said two locations spaced apart from each other, said two locations being disposed at different levels.

13. A device according to claim 1, further comprising means for longitudinally stiffening edges of said plate.

14. A device according to claim 13, wherein said stiffening means comprises two tubular elements which are made of waterproof material adapted to be inflated with fluid under pressure and which are located on said edges of said plate.

15. A device according to claim 1, wherein said plate is made of plastic material.

16. A device according to claim 1, wherein said plate is made of a thermosetting resin strengthened with fibers.

17. A device according to claim 1, wherein said plate is made of a polyester resin and said deformation elements are made of rubberized fabric.

18. A device according to claim 1, wherein said deformation elements are made of a fabric coated with natural materials and/or the like.

19. A device according to claim 1, wherein a sample of said plate corresponding to a square surface with sides of 1 meter and thickness of 1 mm has a characteristic such that when said sample is restrained at one end point and submitted at the other end point to a bending moment of 1 kgm, the plate assumes a curved shape with a radius in the range of 50 to 500 cm.

* * * * *